(12) United States Patent
Usui

(10) Patent No.: US 7,443,422 B2
(45) Date of Patent: Oct. 28, 2008

(54) BLUR CORRECTION APPARATUS AND CAMERA

(75) Inventor: Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 785 days.

(21) Appl. No.: 10/628,398

(22) Filed: Jul. 29, 2003

(65) Prior Publication Data

US 2004/0136704 A1  Jul. 15, 2004

(51) Int. Cl.
*H04N 5/228*  (2006.01)
*H04N 5/222*  (2006.01)
*H04N 17/00*  (2006.01)

(52) U.S. Cl. ............ 348/208.11; 348/371; 396/55

(58) Field of Classification Search .......... 348/208.2, 348/208.11, 370, 371; 396/55
See application file for complete search history.

(56) References Cited

U.S. PATENT DOCUMENTS

| | | | | |
|---|---|---|---|---|
| 5,084,724 A | * | 1/1992 | Maeno | 396/55 |
| 5,619,293 A | * | 4/1997 | Usui | 396/55 |
| 5,897,226 A | * | 4/1999 | Okada et al. | 396/55 |
| 5,973,856 A | * | 10/1999 | Kanbara | 396/72 |
| 6,704,501 B1 | * | 3/2004 | Washisu | 396/55 |
| 6,900,831 B2 | * | 5/2005 | Nishiwaki | 348/208.5 |
| 7,113,204 B2 | * | 9/2006 | Eto et al. | 348/208.2 |

FOREIGN PATENT DOCUMENTS

| | | |
|---|---|---|
| JP | A 10-339898 | 12/1998 |
| JP | A-2003-307762 | 10/2003 |

* cited by examiner

*Primary Examiner*—Nhan T Tran
(74) *Attorney, Agent, or Firm*—Oliff & Berridge, PLC

(57) ABSTRACT

When a photographing apparatus that is in a photographing enabled state but, at the same time, in a blur correction disabled state, is expected to be subjected to a shock, e.g., when an flash device in the photographing apparatus is about to be deployed, a blur correcting optical system is held at a constant position over a necessary length of time. In addition, at the start of a photographing operation, the blur correcting optical system is moved to a position at which the optical axis of the photographic optical system and the optical axis of the blur correcting optical system are substantially aligned with each other and the blur correcting optical system is held at the position. As a result, it becomes possible to dispense with a lock mechanism for holding the blur correcting lens and, at the same time, power consumption is reduced.

26 Claims, 7 Drawing Sheets

BLUR CORRECTION APPARATUS AND CAMERA

The disclosures of the following applications are herein incorporated by reference:

Japanese Patent Application No. 2002-246623, filed Aug. 27, 2002

Japanese Patent Application No. 2001-297149, filed Sep. 27, 2001

BACKGROUND OF THE INVENTION

1. Field of the Invention

The present invention relates to a blur correction apparatus employed in conjunction with a lens barrel of a silver halide camera, a so-called digital still camera or the like, which corrects an image blur by moving part of or the entirety of the photographic lens.

2. Description of the Related Art

Concentrated efforts have been made in recent years to establish technologies for correcting a blur of an image photographed with a camera by detecting camera vibration and partially moving the lens along the direction of the camera vibration so as to correct the image blurring on the film surface. We have also seen a significant advance of so-called digital still cameras (hereafter referred to as DSCs) that utilize photoelectric conversion elements as image-capturing elements without using any film in recent years. A DSC normally includes a liquid crystal viewfinder and a liquid crystal monitor. Since it requires a considerable amount of power for arithmetic processing and the like executed on images as well, it consumes a great deal of power. Accordingly, reducing the power requirement in the DSC is important.

In addition, the DSC, having an image-capturing surface smaller in size compared to the silver halide format size in the related art and thus having a smaller image circle in the optical system, makes it possible to reduce the size of the components of the lens barrel. Accordingly, high expectations are placed on the DSC for its potential for achieving miniaturization.

At the same time, as an increasingly higher magnification factor is assured and also the magnification factor can be raised freely through image processing (the so-called digital zoom), it is preferable for the DSC to have an accurate blur correction function. For instance, the magnification may be raised by a factor of 8 through optical zoom and then it may be further raised through digital zoom. In such a case, the likelihood of hand movement causing image blurring in long focal point photographing becomes higher. Thus, it is essential that cameras having long focal point capability be equipped with a blur correction function. For this reason, the DSC today comes equipped with a blur correction apparatus.

The blur correction unit used in conjunction with a blur correcting interchangeable lens requires a lock mechanism that mechanically holds the blur correcting lens at a predetermined position in the related art, since the blur correcting interchangeable lens may be mounted at a camera which is not capable of supplying power and the position of the blur correcting lens becomes indeterminate in such a case. The lock mechanism is also necessary in a camera compatible with the blur correcting interchangeable lens, in order to prevent the position of the blur correcting lens from becoming indeterminate when the blur correction function is not engaged.

However, the presence of the blur correcting lens lock mechanism presents difficulties in miniaturizing the components of the lens barrel, leading to a problem of an increase in the camera size. The presence of the lock mechanism places a particularly significant hindrance to achieving miniaturization of a DSC which does not allow lens exchange.

Now, let us examine a structure that does not include the blur correcting lens lock mechanism. In a blur correction-enabled state in which a blur correction operation is enabled (in a blur correction ON state), the blur correcting lens is driven and thus, the position of the blur correcting lens does not become indeterminate. However, in a blur correction-disabled state in which the blur correction operation is not enabled (in a blur correction OFF state), the position of the blur correcting lens will become indeterminate without a lock mechanism and thus the problem arises in that the desired optical performance cannot be achieved during the photographing operation. In addition, there is another problem in that if the camera includes a flash device having a light emission unit which pops up, for instance, the blur correcting lens is bound to move when the light emission unit is deployed, resulting in a movement of the image displayed at the liquid crystal viewfinder, the liquid crystal monitor and the like.

These problems may conceivably be eliminated through a method in which control is implemented to hold the blur correcting lens at a constant position at all times by, for instance, constantly supplying power to a VCM to prevent any movement of the blur correcting lens.

However, since power must be constantly supplied to the VCM in order to hold the blur correcting lens at the set position at all times, a great deal of power is required, which leads to a reduction in the battery service life. Thus, in view of the need to minimize power consumption in the DSC explained earlier, it is difficult to assure enough power to control the blur correcting lens so as to hold it at the set position at all times.

SUMMARY OF THE INVENTION

A blur correction apparatus according to the present invention comprises a blur correcting optical system constituting at least a part of a photographic optical system, which corrects a blur occurring at an image-capturing surface of a photographing apparatus by moving within a movable range extending along a direction substantially perpendicular to an optical axis of the photographic optical system, a blur correction drive unit that drives the blur correcting optical system, a blur correction operation enabling unit that selects either a blur correction enabled state in which a blur correction operation executed by driving the blur correcting optical system is enabled or a blur correction disabled state in which the blur correction operation is disabled and a control unit that controls the blur correction drive unit in the blur correction disabled state so as to hold the blur correcting optical system at a constant position over a required length of time starting at a specific time point.

The blur correcting optical system can freely move within the movable range in the blur correction disabled state.

The specific time point at which the blur correcting optical system starts to be held at the constant position may be a time point at which a photographing operation starts. The specific time point may instead be a time point at which a shock is applied to the photographing apparatus. In this case, the time point at which the photographing apparatus experiences the shock should include at least one of; a time point at which the flash device included in the photographing apparatus is deployed, a time point at which the focal length is changed by the photographic optical system, a time point at which a focusing operation is executed with the photographic optical system and a time point at which the power to the photographing apparatus is turned on.

A blur correction apparatus according to the present invention comprises a blur correcting optical system constituting at least a part of a photographic optical system, which corrects at blur occurring at an image-capturing surface of a photographing apparatus by moving within a movable range extending along a direction substantially perpendicular to an optical axis of the photographic optical system, a blur correction drive unit that drives the blur correcting optical system, a blur correction operation enabling unit that selects either a blur correction enabled state in which a blur correction operation executed by driving the blur correcting optical system is enabled or a blur correction disabled state in which the blur correction operation is disabled and a control unit that controls the blur correction drive unit in the blur correction disabled state so as to move the blur correcting optical system to a position at which the optical axis of the photographic optical system and an optical axis of the blur correcting optical system are substantially aligned with each other at a start of a photographing operation and hold the blur correcting optical system at the position.

A photographing apparatus according to the present invention comprises the blur correction apparatus described above, an image-capturing device that electronically captures an image obtained through the photographic optical system and a recording processing unit that records the image into a recording medium. The photographing apparatus may further comprise a display unit that displays the image obtained through the photographic optical system.

DETAILED DESCRIPTION OF THE PREFERRED EMBODIMENT

Figure 1:
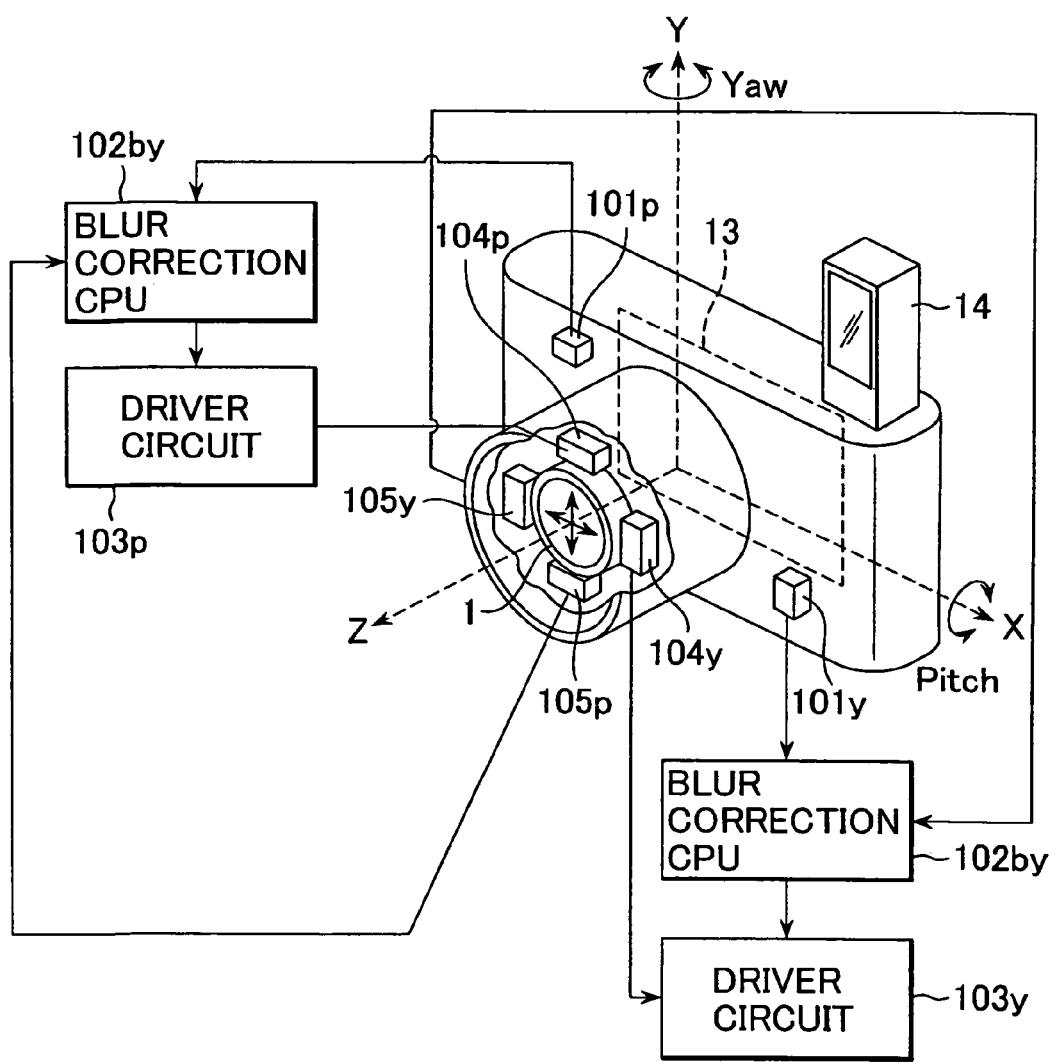
FIG. 1 schematically illustrates an embodiment of the DSC according to the present invention.

The following is an explanation of the blur correction apparatus and the photographing apparatus according to the present invention achieved in an embodiment, given in reference to the drawings and the like. FIG. 1 illustrates schematically an embodiment of a DSC (digital still camera) having the blur correction apparatus according to the present invention mounted therein.

A camera vibration is constituted of a rotation motion that includes pitching, yawing and rolling movements representing three degrees of freedom and a translational motion that includes movement along an X direction, a Y direction and a Z direction, representing three degrees of freedom. Thus, it can be expressed with a total of six degrees of freedom. Blur correction is usually executed with regard to the pitching and yawing movements corresponding to two degrees of freedom.

The blur correction apparatus is equipped with an angular speed sensor 101, a main CPU 102$a$ and a blur correction CPU 102$b$, a voltage driver 103, a VCM 104, an optical position detection devices 105 and the like. The blur correction apparatus includes two control systems, i.e., a pitch control system and a yaw control system. Since these control systems adopt similar structures, the letters p and y are attached to indicate pitch and yaw in FIG. 1 to allow a single explanation to suffice with regard to the two control systems.

The angular speed sensor 101 which monitors vibration motion occurring at the camera, is constituted of a piezoelectric vibration-type angular speed sensor that detects Coriolis force caused by rotation. More specifically, the angular speed sensor 101 includes an angular speed sensor 101$p$ for pitching vibration detection and an angular speed sensor 101$y$ for yawing vibration detection.

The blur correction CPU 102$b$ executes processing for converting quantized outputs from the angular speed sensors 101$p$ and 101$y$ into target position information for a blur correcting lens 1. This target position information is input to VCMs (voice coil motors) 104$p$ and 104$y$ constituting an electromagnetic drive unit of the blur correction unit by using voltage drivers 103$p$ and 103$y$ so as to allow the VCMs 104$p$ and 104$y$ to move the blur correcting lens 1 for blur correction.

Optical position detection devices 105$p$ and 105$y$ detect the position of the blur correcting lens 1. The detected position of the blur correcting lens 1 is output to the blur correction CPU 102$b$ to be used in drive control for the blur correcting lens 1.

By adopting the structure described above to drive the blur correcting lens 1 in correspondence to the extent of the vibration, the blur caused by an unsteady hand movement can be corrected.

Figure 2:
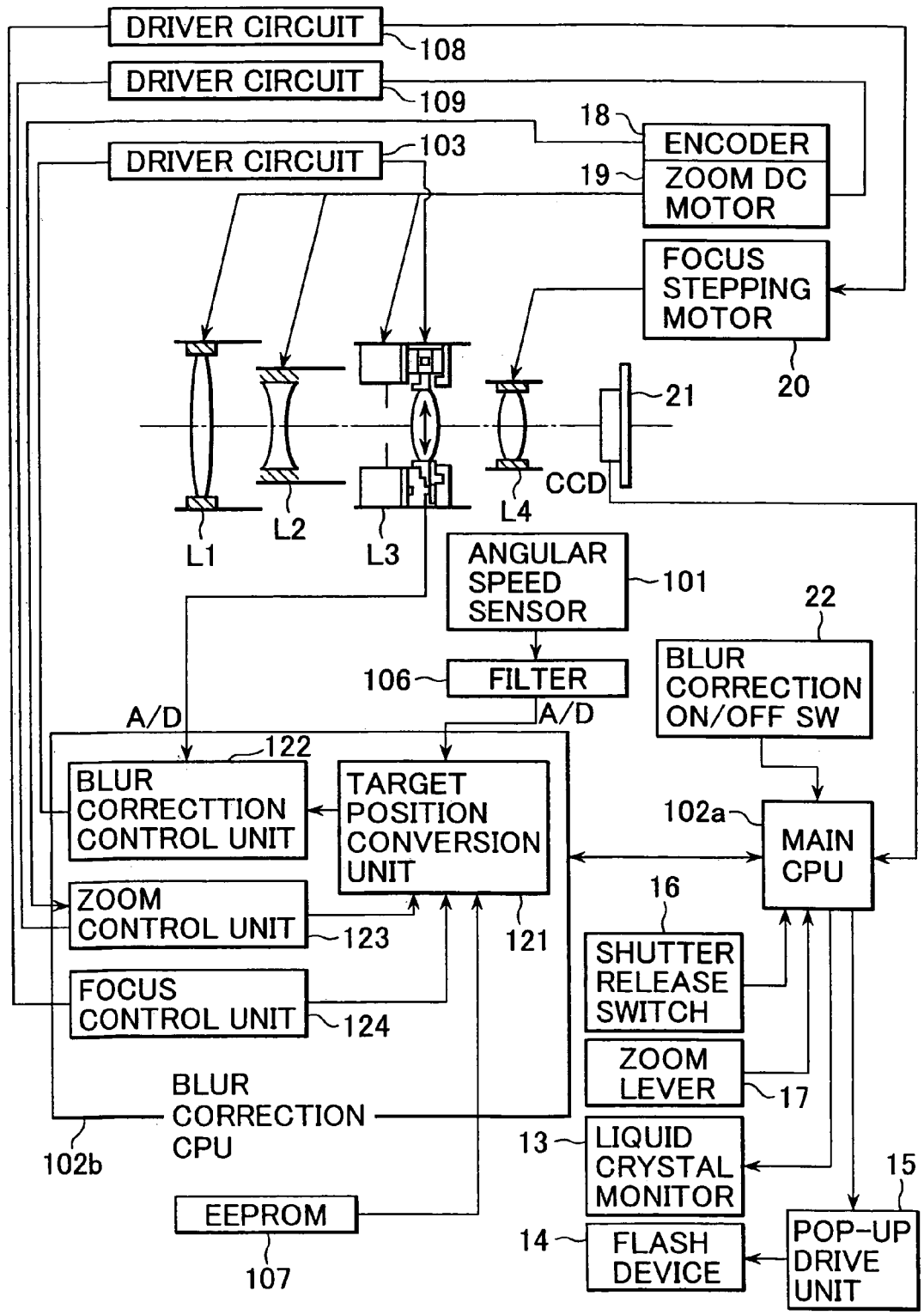
FIG. 2 is a block diagram of the DSC achieved in the embodiment of the present invention.

FIG. 2 is a block diagram of the DSC having the blur correction apparatus according to the present invention mounted therein, as achieved in the embodiment. The DSC in the embodiment includes a liquid crystal monitor 13, an flash device 14, a pop-up drive unit 15, a shutter release switch 16, a zoom lever 17, an encoder 18, a zoom DC motor 19, a focus stepping motor 20, a CCD 21, a blur correction ON/OFF switch 22, the angular speed sensor 101, a main CPU 102$a$, a blur correction CPU 102$b$, driver circuits 103, 108 and 109, the VCM 104, the optical position detection devices 105, a filter 106, an BEPROM 107, lens groups L1 to L4 and the like. A still image obtained through a photographing operation is recorded into a recording unit such as a memory card (not shown).

The liquid crystal monitor 13, which is provided at the camera rear surface, displays a photographed still image or the like in response to a command issued by the main CPU 102$a$. The flash device 14 illuminates the subject by emitting flash light whenever necessary, e.g., when the subject brightness is low. The flash device 14, which is normally housed inside the camera, automatically deploys and emits light through control implemented by the main CPU 102$a$ in response to a halfway press operation of the shutter release switch 16 whenever necessary, e.g., when a sufficient quantity of light is not available.

The pop-up drive unit 15, which is controlled by the main CPU 102$a$, deploys the flash device 14. When the flash device 14 is housed inside the camera, it magnetically holds the flash device 14 with a magnet (not shown), whereas it deploys the flash device 14 by supplying power to a coil (not shown) thereby canceling out the magnetic force of the magnet and using the force applied by a spring (not shown) when the flash device 14 needs to be deployed.

The shutter release switch 16 and the zoom lever 17 are operating members used in a shutter release operation and a zooming operation respectively, and are both connected to the main CPU 102a. The encoder 18, which may be, for instance, a photointerrupter, detects the rotational angle of the zoom DC motor 19. Zoom encoder information output from the encoder 18 is input to a target position conversion unit 121 via a zoom control unit 123.

The zoom DC motor 19 drives the lens groups L1 to L3 via a speed reducing mechanism (not shown) and thus alters the focal length. The lens barrel can be shortened through the drive of the zoom DC motor 19 as well. The focus stepping motor 20 drives the lens group L4 along the optical axis to execute a focal adjustment operation.

The CCD 21 is connected to the main CPU 102a and electronically captures an image obtained through the lens groups L1 to L4.

The blur correction ON/OFF switch 22, which is connected to the main CPU 102a, is an operating member used to selectively switch to a blur correction enabled state in which a blur correction operation is enabled (a blur correction ON state) or a blur correction disabled state in which the blur correction operation is disallowed (a blur correction OFF state) The blur correction ON/OFF switch 22 is normally located at the camera main body.

The angular speed sensor 101 is mounted at the camera main body. The output of the angular speed sensor 101 is quantized through A/D conversion via an amplifier (not shown) and the low pass filter 106 and is then input to the blur correction CPU 102b.

The main CPU 102a primarily executes camera sequence processing and processing related to image processing. The main CPU 102a is connected with the blur correction ON/OFF switch 22, the shutter release switch 16, the zoom lever 17, the liquid crystal monitor 13, the pop-up drive unit 15, the CCD 21 and the like.

The blur correction CPU 102b, having the target position conversion unit 121, a blur correction control unit 122, the zoom control unit 123 and a focus control unit 124, executes control for zoom drive, focus drive and blur correction drive.

It is to be noted that the main CPU 102a and the blur correction CPU 102b may together constitute one CPU.

The zoom control unit 123 controls the drive of the zoom lens groups (L1 to L3). Based upon information on an operation of the zoom lever 17 transmitted by the main CPU 102a, the zoom control unit 123 drives the zoom DC motor 19 via the driver circuit 109.

The focus control unit 124 controls the drive of lens group L4 based upon focus drive quantity information transmitted from the main CPU 102a. The focus drive quantity information transmitted from the main CPU 102a is provided to the focus drive stepping motor 20 via the driver circuit 108 provided in conjunction with the stepping motor. The focus drive quantity information is also input to the target position conversion unit 121 detailed below.

The target position conversion unit 121 obtains through calculation, target position information for the blur correcting lens 1 based upon the zoom encoder information and the focus drive quantity information mentioned above and also based upon an adjustment value written in the EEPROM 107. The target position information obtained through the calculation executed at the target position conversion unit 121 is input to the blur correction control unit 122.

The blur correction control unit 122 executes follow-up control so as to ensure that the blur correcting lens 1 is driven based upon the target position information input from the target position conversion unit 121. The output from the blur correction control unit 122 is input to the driver circuit 103 as a digital drive signal. The driver circuit 103 executes a switching operation based upon the drive signal, applies a voltage to a coil unit 3 (see FIG. 3) of the VCM 104 to drive the VCM 104.

The position of the blur correcting lens 1 is detected with the optical position detection devices 105 to be detailed later. The output from a PSD 10 (see FIG. 3) of the optical position detection devices 105 undergoes an A/D conversion via an amplifier and a low pass filter (not shown) and is then input to the blur correction CPU 102b.

The blur correction CPU 102b calculates $(V1-V2)/(V1+V2)$ based upon outputs V1 and V2 at the two ends of the PSD 10 and multiple the value $(V1-V2)(V1+V2)$ by a gain adjustment value which has been written at the factory so as to convert the value to position information indicating the position of the blur correcting lens 1. The position information on the blur correcting lens 1 obtained through the conversion is then fed back to the blur correction control unit 122.

In addition, the blur correction CPU 102b engages in communication with the main CPU 102a over constant time intervals. The information exchanged through the communication includes information indicating the state of the blur correction ON/OFF switch 22, information indicating the state of the shutter release switch16, information provided through the zoom lever 17 and body sequence information. The body sequence information is information related to a lens barrel drive-out start, a lens barrel drive-in start, a flash device deploy start and the like.

The driver circuits 103, 108 and 109 drive the VCM 104, the focus stepping motor 20 and the zoom DC motor 19 respectively. The VCM 104 is a voice coil motor that drives the blur correcting lens 1. The driver circuit 103 and the VCM 104 constitute the blur correction drive unit that drives the blur correcting lens 1.

The optical position detection devices 105 are sensors that detect the position of the blur correcting lens 1. The filter 106 is a low pass filter provided to remove the noise component from the signal output from the angular speed sensor 101.

The EEPROM 107 is a nonvolatile storage unit in which various adjustment values including the gain adjustment values for the optical position detection devices 105 and other value settings, for instance, are stored.

The lens groups L1 to L4 constitute a photographic optical system. The lens groups L1 to L3 together function as a zoom group, whereas the lens group L4 functions as a focus group. In addition, the lens group L3 includes a blur correction unit and is connected to the blur correction CPU 102b.

Figure 3:
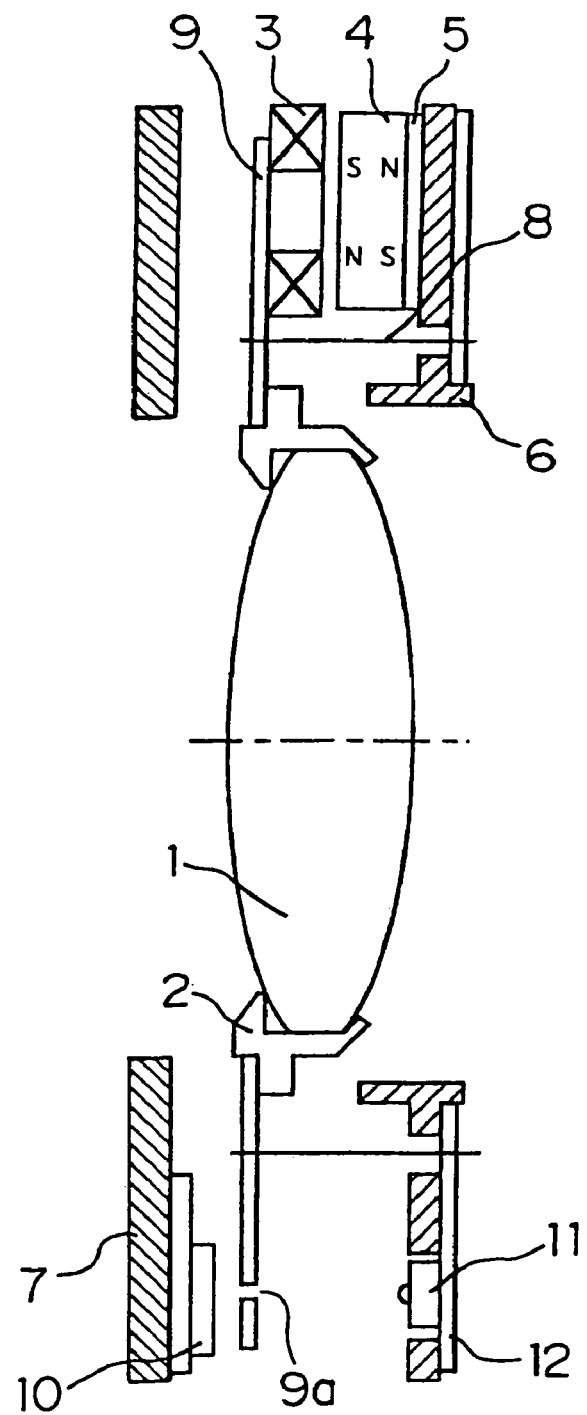
FIG. 3 shows an enlargement of the blur correction unit included in the lens group L3.

FIG. 3 shows the blur correction unit included in the lens group L3 in an enlargement. The blur correcting lens 1 constitutes a blur correcting optical system held by a lens chamber 2 through caulking.

A movable electric substrate 9 is bonded to the lens chamber 2 which is a member used to hold the blur correcting lens 1. The coil 3 used to drive the blur correcting lens 1 is mounted at the movable electric substrate 9. The lens chamber 2 is held with four spring members 8. The spring members 8 are constituted of an electrically conductive material such as phosphor bronze. As the spring members 8 flex, the lens chamber 2 is allowed to move, as it would in a structure having a link mechanism, smoothly along a direction substantially perpendicular to the optical axis. Power is supplied to the coil 3 via the spring members 8.

A magnet 4 is a permanent magnet bonded to a yoke 5. The yoke 5 is fixed to a right substrate 6 to maintain the gap between the magnet 4 and the coil 3 at the correct value. As a current is supplied to the coil 3, a drive force is generated along the direction substantially perpendicular to the optical axis by the current and the magnetic flux in the magnetic circuit constituted of the magnet 4 and the yoke 5. The coil 3, the magnet 4 and the yoke 5 constitute the VCM 104.

The position of the blur correcting lens 1 is detected with the PSD 10. An LED 11 is attached to an electric substrate 12 fixed to the right substrate 6. Light cast by the LED 11 travels through a slit 9a provided at the movable electric substrate 9 and enters the PSD 10 fixed to a left substrate 7. The PSD 10 is an element capable of detecting the position of the gravitational center of the incident light. As the slit 9a moves, the position of the gravitational center of the light entering the PSD 10 moves as well. Thus, the position of the blur correcting lens 1 can be detected by detecting the position of the gravitational center of the light. The slit 9a, the PSD 10 and the LED 11 together constitute the optical position detection device 105.

It is to be noted that the blur correction unit in the embodiment does not include a lock mechanism for locking the blur correcting lens 1, as shown in FIG. 3. Thus, the space used to house the locking mechanism in the related art can be utilized efficiently and the DSC is achieved as a more compact apparatus compared to a DSC in the related art which includes a lock mechanism. In addition, since no lock mechanism is included, the blur correcting lens 1 is left in a state which allows it to move freely within the movable range while the blur correction control is not executed.

Figure 4:
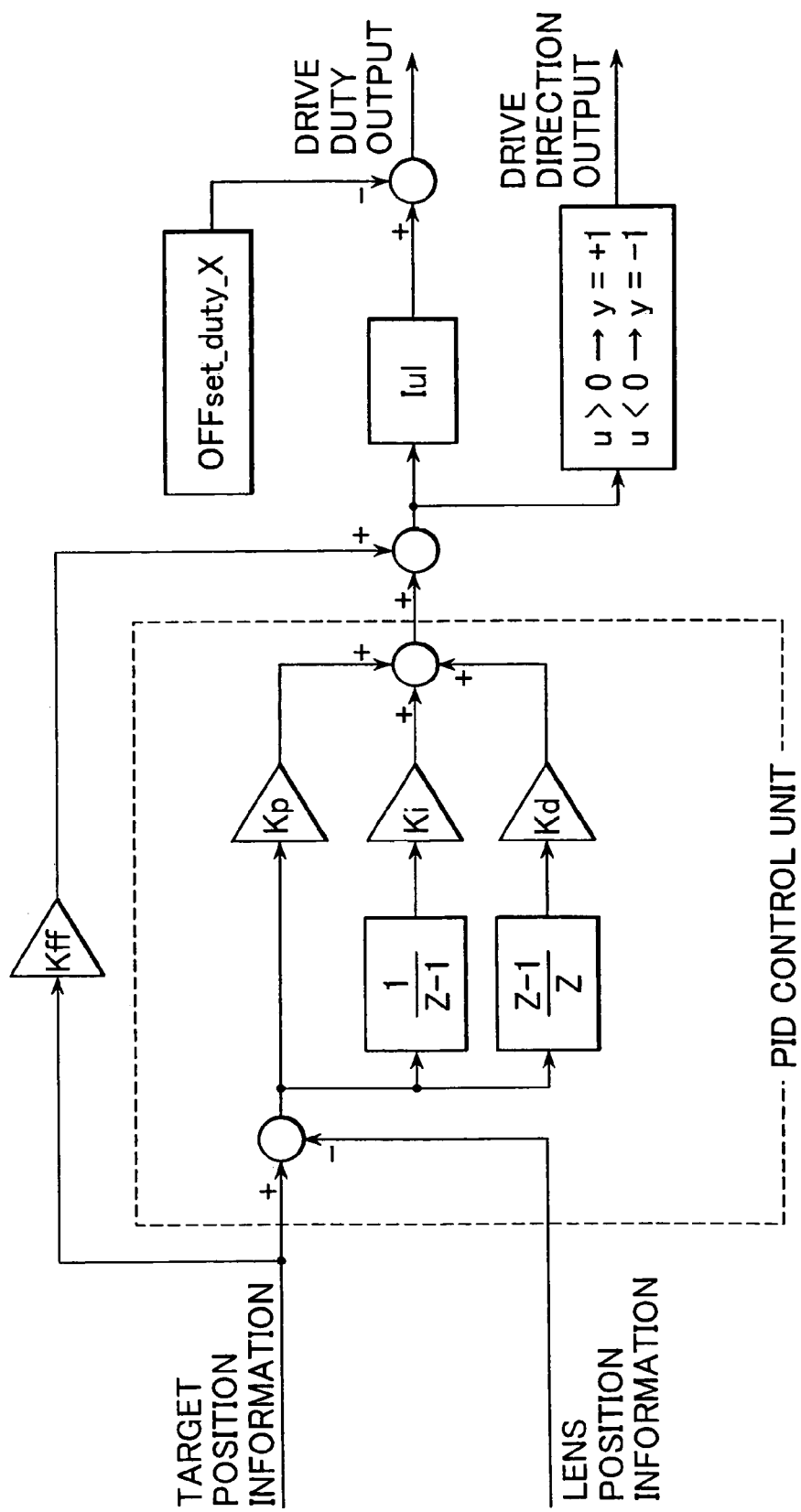
FIG. 4 is a block diagram of the control executed by the blur correction control unit 122.

Next, the control implemented by the blur correction control unit 122 is explained in detail. FIG. 4 is a block diagram provided to facilitate an explanation of the control implemented by the blur correction control unit 122.

As mentioned earlier, the target position information obtained through the conversion executed at the target position conversion unit 121 and the position information indicating the position of the blur correcting lens 1 (lens position information) detected by the optical position detection devices 105 are input to the blur correction control unit 122.

PID control is first explained. The PID control is executed by using the deviation of the lens position information indicating the position of the blur correcting lens 1 relative to the target position information ascertained for the blur correcting lens 1. First, the lens position information is subtracted from the target position information and then the numerical value obtained through the subtraction is multiplied with a proportional constant Kp (a proportional term). In addition, the results of the subtraction of the lens position information from the target position information and information indicating the results of the subtraction executed for the immediately preceding sampling are added together, and the sum is multiplied with an integration constant Ki (integral term). Also, the information indicating the results of the subtraction executed for the immediately preceding sampling is subtracted from the results of the subtraction of the lens position information from the target position information, and the subtraction value is multiplied with a differentiation constant Kd (a differential term). It is to be noted that Z in FIG. 4 represents Z conversion and 1/Z in FIG. 4 represents the information obtained from the immediately preceding sampling.

The sum obtained by adding together the proportional term, the integral term and the differential term is output from the PID control unit.

While the PID control is in progress, a feedforward value is obtained through an arithmetic operation. A feedforward output is obtained by multiplying the target position information by a feedforward constant Kff. As explained earlier, the movable portion of the blur correction unit is elastically supported with the four spring members 8. In the feedforward calculation, the level of the force to resist the spring force is calculated. Through the feedforward calculation, the stability of the control can be enhanced.

The feedforward value obtained as described above and the results of the arithmetic operation executed in the PID control are added together. Subsequently, a direction component in the output indicating the sum is extracted. If the sum output is positive, the drive direction output is set to +1, whereas if the sum output is negative, the drive direction output is set to −1.

In addition, the absolute value of the sum output is calculated, an $OFFset_{13}$ duty equivalent to the driver dead band quantity obtained through a separate inspection is subtracted from the absolute value of the sum output, and the results of the subtraction are output to the driver circuit 103 as a drive Duty.

Next, the operations executed by the blur correction CPU 102b are explained.

(Main Sequence)

Figure 5:
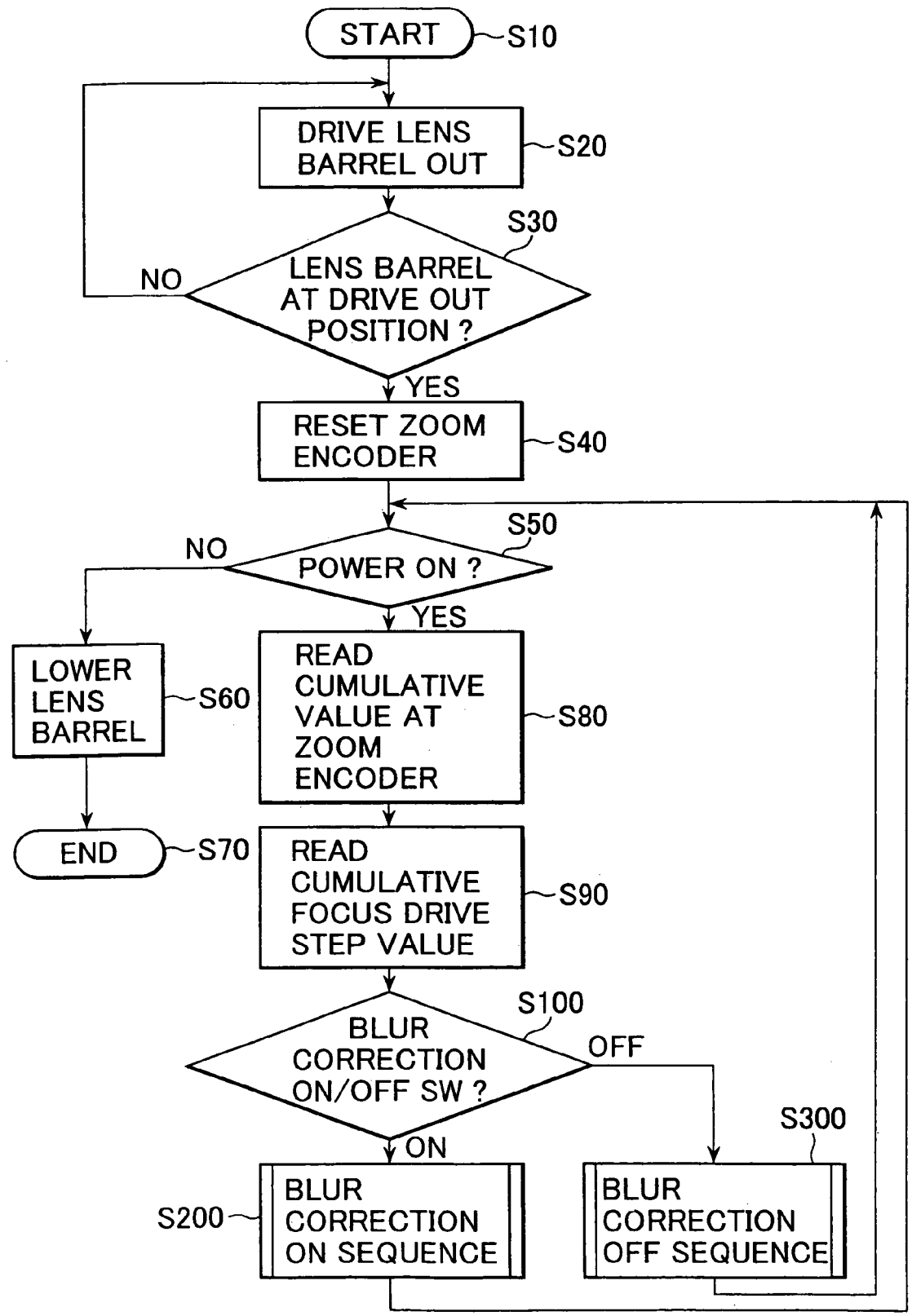
FIG. 5 presents a flowchart of the main operation executed by the blur correction CPU 102$b$.

FIG. 5 presents a flowchart of the main operation executed by the blur correction CPU 102b. In step S10, the processing starts as the power is turned on. In step S20, the zoom DC motor 19 is driven to drive out the lens barrel. In step S30, following step S20, the encoder 18 mounted at the zoom DC motor 19 is monitored and a decision is made as to whether or not the lens barrel has reached the drive-out position. If it is decided that the lens barrel has reached the drive-out position, the operation proceeds to step S40, whereas if it is decided that the lens barrel has not yet reached the drive-out position, the operation returns to step S20 to continue driving the zoom DC motor 19 until the lens barrel reaches the drive-out position.

In step S40, the cumulative value at the encoder 18 is reset and then the operation proceeds to step S50. In step S50, a decision is made as to whether or not the power is in an ON state. It is to be noted that the power ON/OFF state is monitored constantly. If it is decided that power is in an OFF state, the operation proceeds to step S60, whereas if it is decided that the power is in an ON state, the operation proceeds to step S80.

In step S60, the zoom DC motor 19 is driven to engage the lens barrel in a drive-in operation, and then the operation proceeds to step S70 to end the processing.

In step S80, the cumulative value at the encoder 18 is read. The blur correction CPU 102b is engaged in zoom control as well. If the zoom lever 17 has been operated toward the long focal point (telephoto) side, the main CPU 102a outputs a zoom telephoto direction drive command. If, on the other hand, the zoom lever 17 has been operated toward the short focal point (wide angle) side, the main CPU 102a outputs a zoom wide angle side drive command. The blur correction CPU 102b executes a cumulative calculation of the output from the encoder 18 by driving the zoom DC motor 19 at a constant speed. In step S80, the calculated cumulative value is read. The cumulative value read from the encoder 18 can be converted to the focal length of the optical system.

In step S90, the cumulative focus drive step value is read. The main CPU 102a provides information indicating the direction along which focus is achieved and the number of drive steps obtained from the image information at the CCD 21 to the blur correction CPU 102b. The focus control unit 124 at the blur correction CPU 102b sends the drive direction information and the number of steps to the focus stepping motor 20. At this time, the cumulative value of the number of steps output to the focus stepping motor 20 is calculated. During the blur correction sequence, the calculated cumulative value is read and is converted to a focus group position.

It is to be noted that there is a risk of loss of synchronism occurring depending upon the drive speed and a load during the focus drive which is executed by using the stepping motor. In the event of such a loss of synchronism, a deviation occurs between the calculated cumulative value of the number of steps and the focus group position. Accordingly, it is necessary to increase or decrease the speed during the focus drive so as to ensure that a loss of synchronism does not occur.

In step S100 following step S90, the state of the blur correction ON/OFF switch 22 sent from the main CPU 102a is read and the state of the blur correction ON/OFF switch 22 is judged. If it is decided that the switch indicates a blur correction ON state, the operation proceeds to step S200 (a blur correction ON sequence), whereas if it is decided that the switch indicates a blur correction OFF state, the operation proceeds to step S300 (a blur correction OFF sequence).

(Blur Correction ON Sequence)

Figure 6:
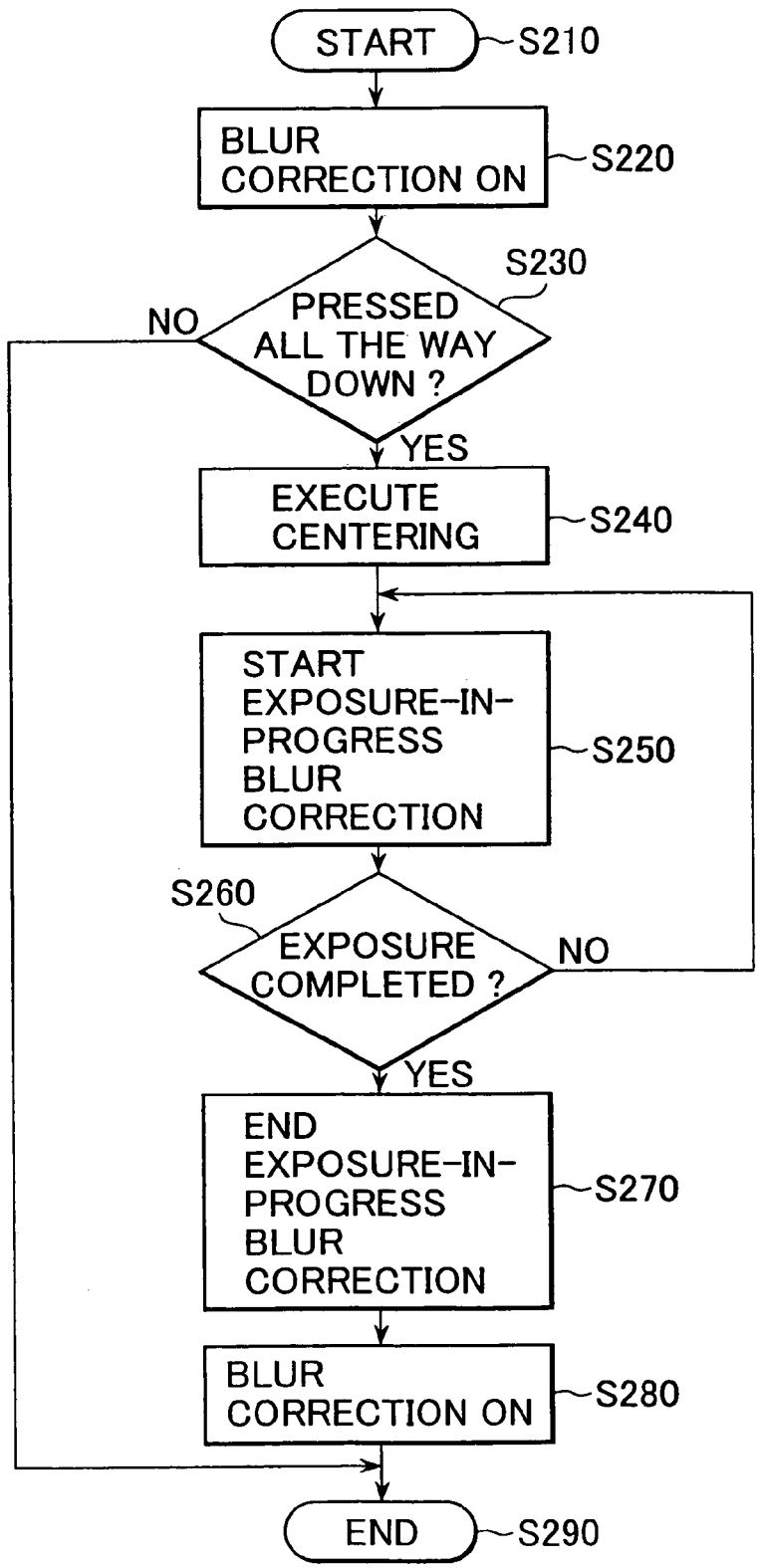
FIG. 6 shows the sequence of the operation executed in a blur correction ON state.

FIG. 6 presents a flowchart of the sequence followed when the blur correction is on. The blur correction sequence starts in step S210 if it is decided in step S100 in the flowchart presented in FIG. 5 that the blur correction ON/OFF switch is in an ON state.

In step S220, a blur correction operation starts (blur correction ON). More specifically, the cumulative value at the encoder mentioned earlier is converted to the focal length value and the cumulative focus drive step value is converted to a focus position. In addition, based upon the value written in the EEPROM 107 and the output from the angular speed sensor 101, a target position for the blur correcting lens 1 is calculated and control is implemented so as to drive the blur correcting lens 1 to the target position. The blur correction is executed through the operation described above.

In step S230, a decision is made as to whether or not the shutter release switch 16 has been pressed all the way down after turning on the blur correction. If it is decided that a full press operation has not been performed, the operation proceeds to step S290 to exit the blur correction ON sequence while sustaining the blur correction. If, on the other hand, it is decided that the shutter release switch 16 has been pressed all the way down, the operation proceeds to step S214 to shift into the photographing sequence.

In step S240, a centering operation is executed. The "centering" refers to an operation during which the blur correcting lens 1 is driven substantially in steps to the central position, i.e., the position at which the optical axis of the blur correcting lens 1 and the optical axes of the lens groups L1, L2 and L4 are substantially aligned), within the movable range. It is to be noted that the blur correcting lens 1 can be driven in a more stable manner if the waveform of the target position signal has a slight inclination rather than having simple steps.

In step S250, photographing in-process blur correction control is turned on. While the normal blur correction control is executed by constantly applying a bias toward the center through center bias control, the photographing-in-progress blur correction control is executed without the center bias control. While the center bias control prevents a drastic movement of the blur correcting lens 1 when it has reached a limit of the movable range, it also induces an error in the correction since the target position information is distorted in the center bias control. Thus, while the photographing operation is in progress, the center bias control is not implemented, to maximize the effect of the correction.

In step S260, a decision is made as to whether not the photographing operation has been completed by judging whether or not a photographing end signal has been input from the main CPU 102a. The operation proceeds to step S270 if it is decided that the photographing operation has been completed, whereas the operation returns to step S250 if it is decided that the photographing operation has not yet been completed.

In step S270, the photographing-in-progress blur correction ends and then the operation proceeds to step S280. In step S280, the operation is switched over to the normal blur correction (blur correction ON) and then the operation exits the blur correction ON sequence while sustaining the blur correction (S290).

(Blur Correction OFF Sequence)

Figure 7:
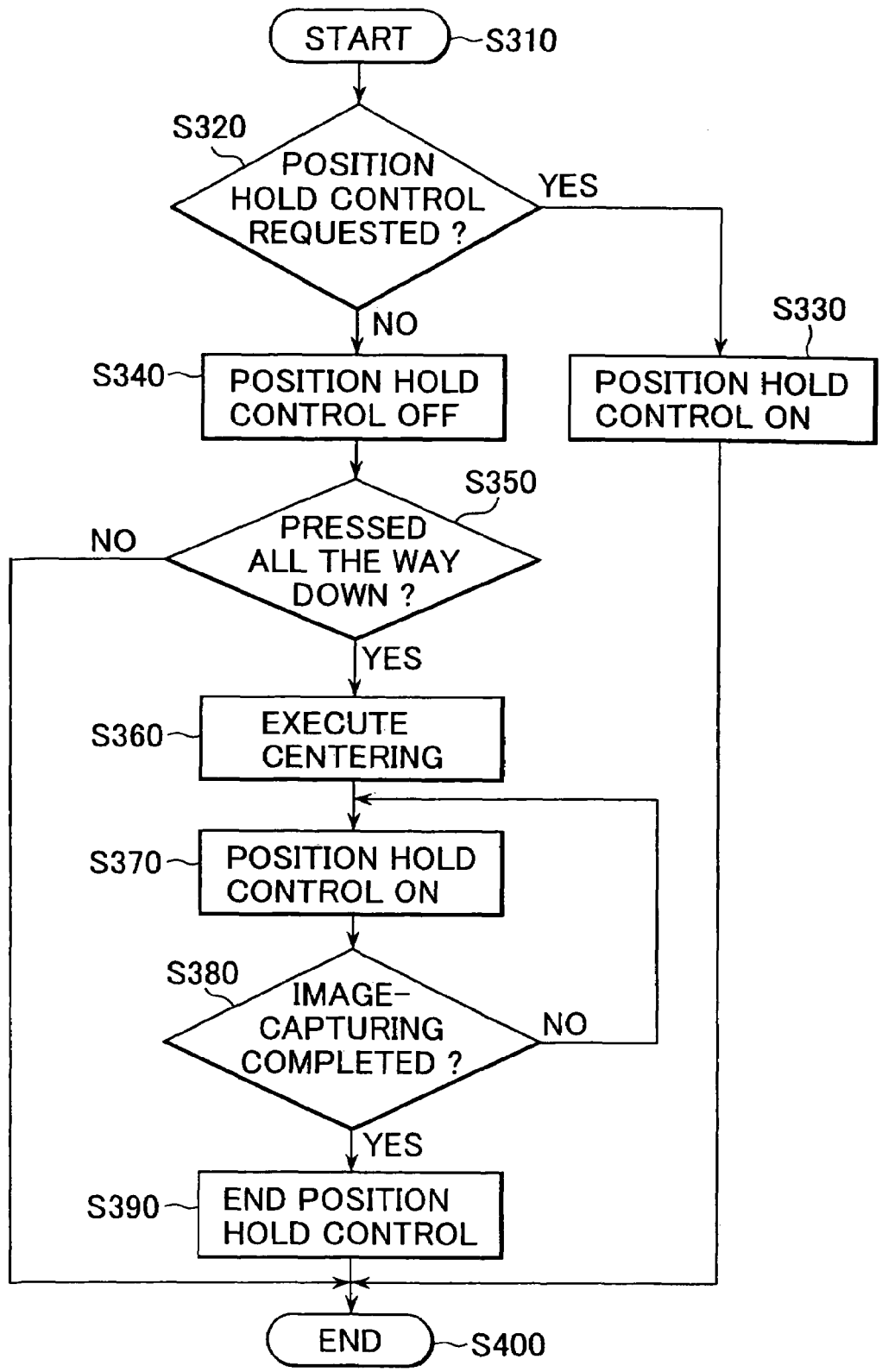
FIG. 7 shows the sequence of the operation executed in a blur correction OFF state.

FIG. 7 presents a flowchart of the sequence followed in a blur correction OFF state. The blur correction OFF sequence starts in step S310 if it is decided in step S100 in the flowchart presented in FIG. 5 that the blur correction ON/OFF switch is in an OFF state.

In step S320, a verification is made to ascertain whether or not a position hold control request has been issued. The position hold control request refers to a signal which requests that the blur correcting lens 1 be held at a constant position for a required length of time and is provided by the main CPU 102a to the blur correction CPU 102b. The operation proceeds to step S340 if it is decided that the position hold control request has not been issued, whereas the operation proceeds to step S330 if it is decided that the position hold control request has been issued.

As described in the explanation of the blur correction unit earlier, no lock mechanism is included in the structure adopted in the embodiment in order to achieve miniaturization. In addition, since the movable portion is supported with the spring members 8, a shock that the camera is subjected to causes a vibration of the blur correcting lens 1 at a primary resonance frequency determined based upon the moving mass of the blur correcting lens 1 and the level of the spring force.

The camera achieved in the embodiment, in which the flash device is deployed with the spring force, is subjected to a shock during a pop-up operation. Accordingly, if the flash device is deployed in the blur correction OFF state, the blur correcting lens 1 would normally vibrate causing a vibration in the image displayed at the liquid crystal monitor 13 to the annoyance of the observer.

Since the flash device is deployed by the main CPU 102a in the embodiment, the pop-up motion of the flash device, i.e., that the camera is about to be subjected to a shock, can be predicted in advance. Accordingly, the main CPU 102a issues the position hold control request to the blur correction CPU 102b when the flash device is deployed so as to hold the blur correcting lens 1 at a constant position in the embodiment.

It is to be noted that the position hold control request is also issued when the camera is subjected to a shock due to another cause, e.g., when changing the focal length (zooming), executing a focus-match operation (focusing) or turning on the power, as well as when deploying the flash device.

In step S330, the position hold control is executed. As explained above, when an imminent shock is expected during the camera photographing sequence, e.g., the flash device is deployed, the main CPU 102a issues the position hold control request. In response to the position hold control request issued by the main CPU 102a, the blur correction control unit 122 detects the current position of the blur correcting lens 1 and implements the position hold control by using the value indicating the current position as a target position. This position hold control is continuously executed until a position hold control flag is released. The position hold control flag is released after a predetermined length of time elapses when the flash device is deployed, for instance.

By executing the position hold control, it is possible to spare the user the irritation of having to observe a blurred image at the liquid crystal monitor 13 due to a movement of the blur correcting lens 1 resulting from a shock which can be predicted in the photographing sequence. The position hold control is not executed when the camera is subjected to a shock that cannot be predicted in the photographing sequence. However, an unexpected shock normally occurs when the camera is struck against another object or when the photographer intentionally moves the camera, for instance, and thus, the photographer does not become bothered by a blurred image. In addition, since the position hold control is not executed unless necessary, the power consumption in the camera can be minimized.

In step S340, to which the operation proceeds after deciding that the position hold control request has not been issued, the position hold control is turned off (the position hold control is not executed), and then the operation proceeds to step S350. In step S350, a decision is made as to whether or not the shutter release switch16 has been pressed all the way down. The operation proceeds to step S400 if it is decided that the shutter release switch16 has not been pressed all the way down to end the blur correction OFF sequence, whereas the operation proceeds to step S360 if it is decided that the shutter release switch16 has been pressed all the way down.

In step S360, a centering operation is executed to align the optical axis of the blur correcting lens 1 with the optical axes of the lens groups L1, L2 and L4. The centering position is equivalent to the center of the movable range of the blur correcting lens 1 in this embodiment. The centering operation is executed in order to improve the optical characteristics of the lenses by aligning the optical axes of the various lens groups since the blur correction unit does not include any lock mechanism so as to achieve miniaturization and thus, the blur correcting lens 1 is off the center of its movable range along the gravitational direction due to gravity (the blur correcting lens 1 is at a descended position) prior to the photographing operation. It is particularly essential that the optical axis of the blur correcting lens 1 be set close to the center of the optical axes of the other lens groups in order to achieve high resolution.

Following the centering operation, the position hold control is executed in step S370, as it is necessary to hold the centered state during the photographing operation in order to keep the optical characteristics in a desirable condition during the photographing operation. When there is no lock mechanism and the movable portion is supported with the springs, the blur correcting lens 1 would normally move at the start of the photographing operation due to the shock of the shutter operation. Accordingly, the blur correcting lens 1 needs to be electrically locked through the position hold control so as to prevent the shock from degrading the quality of the image as well.

In step S380 following step S370, a decision is made as to whether or not the photographing operation has been completed. This decision is made based upon whether or not a photographing end signal has been input from the main CPU 102*a* to the blur correction CPU 102*b*. The operation returns to step S370 to continuously execute the position hold control if it is decided that the photographing operation has not been completed, whereas the operation proceeds to step S390 if it is decided that the photographing operation has been completed.

In step S390, the position hold control ends, and the operation proceeds to step S400 to exit the blur correction OFF sequence.

While no lock mechanism for holding the blur correcting lens is included in the photographing apparatus (camera) in the embodiment, the position hold control is executed as long as necessary whenever an imminent shock is predicted in the blur correction OFF sequence and thus, it is possible to display a natural-looking image at the liquid crystal monitor without requiring excessive power.

In addition, since the centering operation is executed before the photographing operation and the centered state is held during the photographing operation, an image achieving a high degree of optical quality can be obtained through the blur correction OFF sequence as well.

When the photographing operation is enabled but the blur correction is not enabled, the blur correction apparatus achieved in the embodiment controls the blur correction drive unit so as to hold the blur correcting optical system at a constant position over the necessary length of time starting at a specific time point. Thus, the blur correcting optical system can be held at constant position only when necessary without having to consume power unnecessarily. Namely, problems that will be caused by instability with regard to the position of the blur correcting optical system are prevented.

Since the blur correcting optical system is allowed to freely move within the movable range when the photographing apparatus is in a photographing enabled state but in a blur correction disabled state, it does not require any lock mechanism.

Since the specific time point at which the hold control for the blur correcting optical system starts is the time point at which the photographing operation starts, the blur correcting optical system is not allowed to move unexpectedly during the photographing operation executed in the blur correction disabled state and thus, an image blur is prevented and the resolution is not lowered.

In addition, by setting the specific time point at which the hold control for the blur correcting optical system starts at a time point at which the photographing apparatus is subjected to a shock during the operating sequence, it is possible to prevent a vibration of the blur correcting optical system that would otherwise result from a predictable shock. Since this time point at which the photographing apparatus is predicted to be subjected to a shock includes at least one of; a time point at which the flash device included in the photographing apparatus is deployed, a time point at which the focal length is altered by the photographic optical system, a time point at which a focus-match operation is executed through the photographic optical system and a time point at which the power is turned on at the photographing apparatus, the advantages of the present invention described above can be maximized in an effective manner in the photographing apparatus.

When the photographing apparatus is in a photographing enabled state but, at the same time, in a blur correction disabled state, the blur correction apparatus in the embodiment controls the blur correction drive unit at a photographing operation start so as to move the blur correction optical system to a position at which the optical axis of the photographic optical system and the optical axis of the blur correcting optical system are substantially aligned with each other and to hold the blur correcting optical system at the position. As a result, an image achieving a high degree of optical performance can be obtained through the photographic optical system without having to consume excessive power or having to provide a lock mechanism.

While the photographing apparatus in the embodiment includes a blur correction apparatus, it does not require any extra power to operate and thus allows the battery service life to be lengthened. As a result, the number of pictures that can be taken is increased. In addition, it is possible to display a natural-looking image at the display unit without consuming power wastefully.

The above described embodiment is an example, and various modifications can be made without departing from the spirit and scope of the invention.

(1) In the embodiment, the present invention is adopted in a DSC when an image is observed at the liquid crystal monitor and when a photograph is taken at the CCD. However, the present invention is not limited to this example and may be adopted when an image is observed through a viewfinder and when an image exposed on film in a silver halide camera.

(2) In the embodiment, a still image is recorded in the DSC. However, the present invention is not limited to this example and may be adopted in, for instance, a photographing apparatus that records dynamic images or in a photographing apparatus capable of recording both still images and dynamic images.

(3) In the explanation given above in reference to the embodiment, the blur correction unit adopts a structure achieved by holding the lens chamber 2 which holds the blur correcting lens 1 with the magnet four spring members 8. However, the present invention is not limited to this example, and it may be adopted in a structure having a lens chamber pressed against a fixed member with a force applied by a spring with the contact portion of the lens chamber that comes into contact with the fixed member constituting a sliding portion which makes a sliding movement. Furthermore, the present invention may also be adopted in a blur correction unit that does not use any springs.

What is claimed is:

1. A blur correction apparatus comprising:
a blur correcting optical system including at least a part of a photographic optical system, which corrects a blur occurring at an image-capturing surface of a photographing apparatus by moving within a movable range extending along a direction substantially perpendicular to an optical axis of the photographic optical system;
a blur correction drive unit that drives the blur correcting optical system;
a blur correction operation enabling unit that selects either a blur correction enabled state in which a blur correction operation executed by driving the blur correcting optical system is enabled or a blur correction disabled state in which the blur correction operation is disabled; and
a control unit that controls the blur correction drive unit in the blur correction disabled state so as to hold the blur correcting optical system at a specific position in the blur correction disabled state by supplying power during an entire holding period in the blur correction disabled state, and that stops supplying power to the blur correction drive unit in the blur correction disabled state so as to not hold the blur correcting optical system at any specific position,
wherein the entire holding period is a period at which the photographing apparatus is subjected to a shock.

2. A blur correction apparatus according to claim 1, wherein:
the blur correcting optical system can freely move within the movable range in the blur correction disabled state when the power supply is stopped.

3. A blur correction apparatus according to claim 1, wherein:
the entire holding period includes a photographing operation executed period.

4. A blur correction apparatus according to claim 1, wherein:
the period at which the photographing apparatus is subjected to a shock is at least one of: a period at which a flash device included in the photographing apparatus is deployed, a period at which a focal length is changed by the photographic optical system, a period at which a focusing operation is executed with the photographic optical system and a period at which power to the photographing apparatus is turned on.

5. A photographing apparatus comprising:
a blur correction apparatus according to claim 2;
an image-capturing device that electronically captures an image obtained through the photographic optical system; and
a recording processing unit that records the image captured by the image-capturing device into a recording medium.

6. A photographing apparatus comprising:
a blur correction apparatus according to claim 3;
an image-capturing device that electronically captures an image obtained through the photographic optical system; and
a recording processing unit that records the image captured by the image-capturing device into a recording medium.

7. A photographing apparatus comprising:
a blur correction apparatus according to claim 4;
an image-capturing device that electronically captures an image obtained through the photographic optical system; and
a recording processing unit that records the image captured by the image-capturing device into a recording medium.

8. A blur correction apparatus according to claim 1, wherein:
the blur correcting optical system is held by electromagnetic force to maintain an image position at the image-capturing surface in the blur correction disabled state.

9. A blur correction apparatus according to claim 1, wherein:
the blur correcting optical system is held at the specific position by supplying the power without any mechanical contact between the blur correcting optical system and the blur correction drive unit.

10. A blur correction apparatus according to claim 1, wherein:
the blur correcting optical system is held at the specific position with at least one elastic member.

11. A blur correction apparatus according to claim 1, wherein:
the control unit controls the blur correction drive unit to hold the blur correcting optical system at the specific position unless a predictable shock has occurred.

12. A blur correction apparatus comprising:
a blur correcting optical system including at least a part of a photographic optical system, which corrects a blur occurring at an image-capturing surface of a photographing apparatus by moving within a movable range extending along a direction substantially perpendicular to an optical axis of the photographic optical system;
a blur correction drive unit that drives the blur correcting optical system;
a blur correction operation enabling unit that selects either a blur correction enabled state in which a blur correction operation executed by driving the blur correcting optical system is enabled or a blur correction disabled state in which the blur correction operation is disabled; and
a control unit that controls the blur correction drive unit in the blur correction disabled state so as to move the blur correcting optical system to a position at which the optical axis of the photographic optical system and an optical axis of the blur correcting optical system are substantially aligned with each other at a start of a photographing operation and hold the blur correcting optical system at the position by supplying power to the blur correction drive unit during an entire holding period of the blur correction disabled state, wherein the entire holding period is a period at which the photographing apparatus is subjected to a shock.

13. A photographing apparatus comprising:

a blur correction apparatus according to claim 12;

an image-capturing device that electronically captures an image obtained through the photographic optical system; and a recording processing unit that records the image captured by the image-capturing device into a recording medium.

14. A photographing apparatus comprising:

a blur correction apparatus according to claim 1;

an image-capturing device that electronically captures an image obtained through the photographic optical system; and a recording processing unit that records the image captured by the image-capturing device into a recording medium.

15. A photographing apparatus according to claim 14 further comprising:

a display unit that displays the image obtained through the photographic optical system.

16. A photographing apparatus having a photographing optical system, comprising:

a movable flash device that illuminates an object;

a corrector that corrects a blur occurring at an image-capturing surface of the photographing apparatus;

a moving mechanism that moves the flash device to a first position, the flash device illuminating the object while at the first position;

a selector that selects one of a correction enabled state to permit working of the corrector and a correction disabled state so as to not permit working of the corrector; and a controller that controls the corrector so as to move the corrector toward an optical axis of the photographing optical system and hold the corrector at a constant position during a movement of the flash device to the first position in the correction disabled state by supplying power to the corrector.

17. A photographing apparatus according to claim 16, further comprising an interchangeable lens that is detachable from the photographing apparatus, the interchangeable lens comprising the corrector.

18. A photographing apparatus according to claim 17, wherein:

the controller controls a driver which drives the corrector to correct the blur.

19. A photographing apparatus according to claim 17, wherein:

the flash device illuminates the object during exposure executed by the photographing apparatus.

20. A photographing apparatus according to claim 17, wherein: the moving mechanism comprises a spring member.

21. A method of correcting a blur occurring at an image-capturing surface of a photographing apparatus having a photographing optical system by a corrector, comprising the steps of:

moving the corrector to a position relating to an optical axis of the photographing optical system;

moving a flash device to a first position, the flash device illuminating an object while at the first position;

selecting one of a correction enabled state to permit working of the corrector and a correction disabled state so as to not permit working of the corrector; and supplying power to the corrector to move the corrector to the position relating to the optical axis and to hold the corrector at a position in the correction disabled state during the movement of the flash device.

22. A method according to claim 21, further comprising the step of:

exposing the object with the photographing apparatus while the flash device illuminates the object.

23. A method according to claim 21, further comprising the step of:

supplying power to the corrector to move the corrector in the first direction.

24. A method of correcting a blur occurring at an image-capturing surface of a photographing optical system by a corrector, comprising the steps of:

selecting one of a correction enabled state to permit working of the corrector and a correction disabled state so as to not permit working of the corrector;

moving the corrector in a first direction to correct the blur in the correction enabled state, the corrector being driven by supplying power;

stopping the supplying of the power in the correction disabled state;

resupplying the power in the correction disabled state to move the corrector to a predetermined position; and resupplying the power during an entire holding period in the correction disabled state to hold the corrector at the predetermined position, wherein the entire holding period is a period at which the photographing optical system is subjected to a shock.

25. A method according to claim 24, wherein:

the corrector in the correction disabled state is held at the predetermined position by electromagnetic force caused by the power.

26. A method according to claim 25, wherein:

the corrector can freely move in the first direction within a movable range while the power is not supplied.

* * * * *